Oct. 26, 1948.　　P. L. SCHNEIDER ET AL　　2,452,496
WINDSHIELD WIPER BLADE OPERATING MECHANISM
Filed April 26, 1947　　3 Sheets-Sheet 1

INVENTORS
Paul L. Schneider &
Derother H. Dudderar
BY
Spencer, Willits, Helmig & Baillio

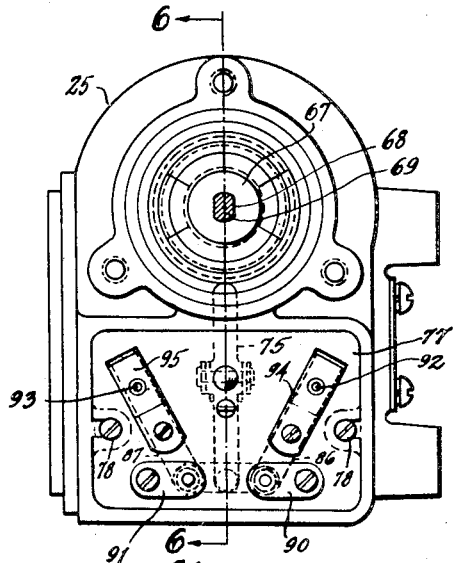

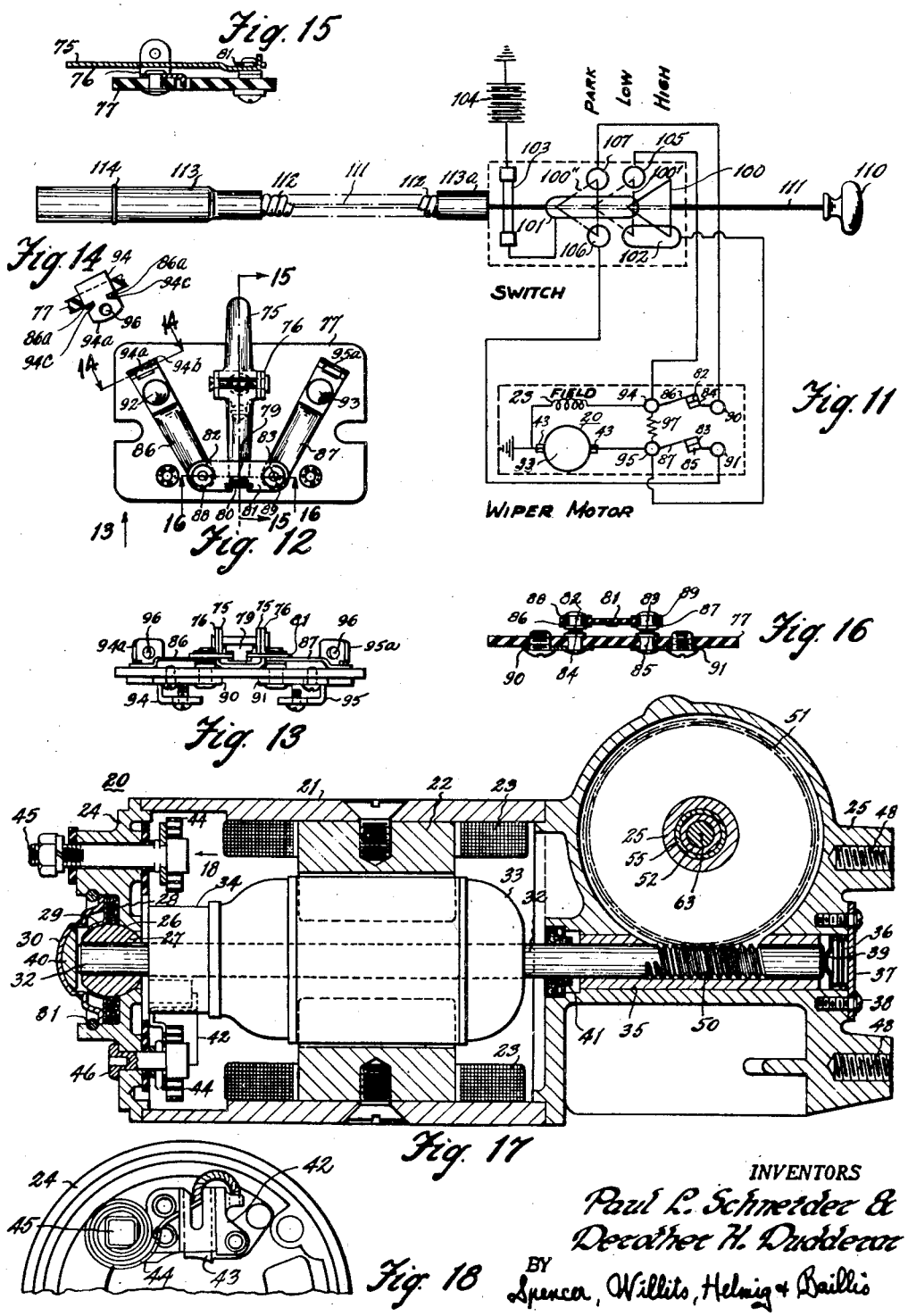

Patented Oct. 26, 1948

2,452,496

UNITED STATES PATENT OFFICE 2,452,496

WINDSHIELD WIPER BLADE OPERATING MECHANISM

Paul L. Schneider and Derother H. Dudderar, Anderson, Ind., assignors to General Motors Corporation, Detroit, Mich., a corporation of Delaware Application April 26, 1947, Serial No. 744,210

6 Claims. (Cl. 74—70)

1

This invention relates to windshield wipers for automotive vehicles.

An object of the invention is to provide a power operated unit for actuating wiper blades and having a manual controlled mechanism for causing the blades to travel in a wiping range or for causing the blades to occupy parking positions outside the wiping range. In the disclosed embodiment, this object is accomplished by the use of mechanism which includes a crank pin which is located for the wiping action at a required radius with respect to the axis of its crank shaft when the manual control is in on position and which is located for the parking action at a greater radius from the axis of its crank shaft in response to actuation of the manual control to off or park position whereby the blades move out of the wiping range into parking positions, and by the use of means for stopping movement of the crank pin when the blades have arrived at parking positions. Coincidentally with stopping the crank pin, the power is automatically turned off. Actuation of the manual control from park to on position turns on the power and retracts the stopping means whereby operation of the mechanism is resumed and, thereby, the crank pin is restored automatically to a location of lesser radius with respect to its crank shaft.

Further objects and advantages of the present invention will be apparent from the following description, reference being had to the accompanying drawings, wherein a preferred embodiment of the present invention is clearly shown.

In the drawings:

Fig. 5 is a sectional view on line 5—5 of Fig. 2.

Fig. 6 is a sectional view on line 6—6 of Fig. 5.

Figs. 7, 8, 9 and 10 are views showing an operating mechanism in different positions.

Fig. 11 is a diagram showing control of the mechanism electrically and mechanically.

Fig. 12 is a view of a switch in the direction of arrow 12 of Fig. 6.

Fig. 13 is a view in the direction of arrow 13 of Fig. 12.

Figures 1, 2, 3, 4:
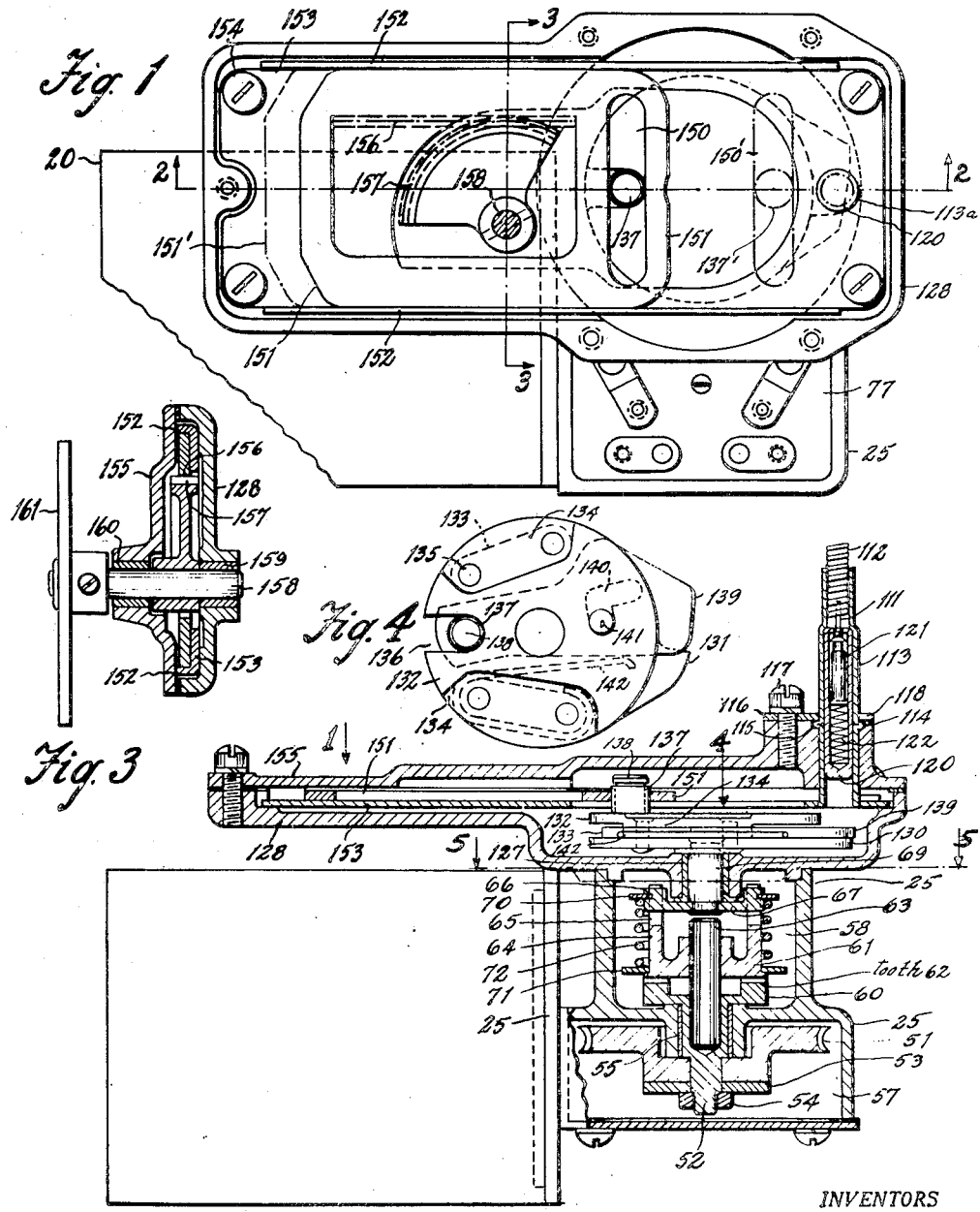
Fig. 1 is a view in the direction of arrow 1 of Fig. 2 with a cover plate removed.
Fig. 2 is a sectional view on line 2—2 of Fig. 1.
Fig. 3 is a sectional view on line 3—3 of Fig. 1.
Fig. 4 is a view in the direction of arrow 4 of Fig. 2 of an operating mechanism.

Figs. 14, 15 and 16 are sectional views taken respectively on lines 14—14, 15—15 and 16—16 of Fig. 12, Fig. 16 being drawn twice size.

Fig. 17 is a sectional view on line 17—17 of Fig. 6.

Fig. 18 is a fragmentary view in the direction of arrow 18 of Fig. 17.

Referring to Fig. 17, an electric motor 20 comprises a field frame 21 carrying pole pieces 22 and field winding 23. Frame 21 is clamped between an end plate 24 and a frame 25 by means of through bolts not shown. Plate 24 provides a spherical seat 26 for a self-aligning, porous metal bearing 27 in contact with an oil-soaked, felt ring 28 providing a lubricant reservoir from which lubricant is drawn into the bearing by capillary attraction. The bearing 27 and the ring 28 are retained by a flanged washer 29 retained by a cap 30 which is retained by a resilient wire snap ring 31. Shaft 32, carrying an armature 33 and a commutator 34, is journaled in the bearing 27 and in a bearing 35 carried by frame 25. Shaft 32 is urged left by a spring 36 retained by a cover plate 37 attached by screws 38 to frame 25. Spring 36 urges disc 39 against the right end of shaft 32, thereby causing its left end to bear against a disc 40 supported by the cap 30. The escape of lubricant from the interior of frame 25 is prevented by shaft seal 41.

Plate 24 supports two brush holders 42 carrying brushes 43 which springs 44 urge against the commutator 34. The upper brush holder, shown in Fig. 18, is insulated and the spring 44, associated therewith, is attached to a terminal stud 45 insulated from the plate 24. The lower brush holder is not insulated from the motor frame and the spring 44, associated with the lower brush holder is attached to a stud 46 mounted on the plate 24, thus providing a good ground connection for the lower brush. Frame 25 is provided with tapped holes 48 which receive screws by which the frame is mounted upon a suitable support.

Shaft 32 is threaded to provide a worm 50 meshing with a worm gear 51 which is connected with a shaft 52 (Fig. 6) by a bar 53 received by a cross slot in the hub of gear 51, the bar having its central hole provided with flats engaging flats on the shaft 52. The gear 51 is retained by a nut 54 threaded on the shaft 52. Shaft 52 is journaled in a bushing 55 supported by a partition 56 which separates a chamber 57 for gear 51 from a chamber 58 which contains a clutch, one member of which is provided by a circular flange 60 of the shaft 52 and the other of which is provided by a member 61. The parts 60 and 61 have interengaging teeth 62 (Fig. 2). The parts 60 and 61 are maintained in alignment by a rod 63 passing through a central bore in the shaft 52 and through a central hole in the hub of the part 61. Part 61 has a cylinder 64 provided with three notches 65, each receiving an arm 66 of a disc 67, the center hole of which is provided with flats received by the flats 68 of a shaft 69 (Fig. 5). The arms 66 of disc 67 support a ring 70 parallel to a ring 71 surrounding the member 61. Spring 72 is confined under compression between the rings 70 and 71 and urges the member 61 toward the member 60 to maintain clutch engagement under yielding pressure.

For reasons to be explained, shaft 69 is stopped while shaft 52 continues rotation. When this occurs, clutch member 61 cannot rotate. Therefore it is cammed by member 60 upwardly in Fig. 2 or toward the left in Fig. 6, by the action of the inclined end faces of the teeth 62, thereby causing the ring 71 to move in the same direction. This movement of ring 71 causes the opening of switches which control the motor. When the clutch parts separate, ring 71 engages a lever 75 pivotally supported by bracket 76 (Figs. 12 and 15) attached to a non-conducting switch terminal plate 77 which screws 78 (Fig. 5) attach to the frame 25. Lever 75 has a T-end 79 (Fig. 13) received by a notch 80 in a non-conducting member 81 (Fig. 12). Referring to Figs. 12 and 16, the movement of plate 81 by lever 75 effects the movement of contacts 82 and 83 with respect to contacts 84 and 85 respectively. The contacts 82 are provided by rivets, the shanks of which pass respectively through the ends of spring blades 86 and 87 through the plate 81 and through washers 88 and 89 respectively and are riveted over against these washers. The contacts 84 and 85 are provided by rivets, the shanks of which pass through the non-conducting plate 77 and terminals 90 and 91 respectively. The spring blades 86 and 87 are attached to the plate 77 by rivets 92 and 93 respectively which also secure terminals 94 and 95 respectively with which said blades are electrically connected. Rotation of the blades 86 and 87 and of the terminals 94 and 95 with respect to their attaching rivets 92 and 93 is prevented by connecting together ends of the terminals and ends of the blades. As shown in Fig. 14, this is accomplished with respect to blade 86 and terminal 94 by an end 94a of the terminal 94 which passes through an oblong hole 94b in plate 77 and which is provided with side notches 94c which receive the forked ends 86a of blade 86. Terminal 95 and blade 87 are connected in the same manner. The terminal ends 94a and 95a are provided with holes 96 to receive the end leads of a resistance unit 97 which is connected between them as shown diagrammatically in Fig. 11.

A manually operated switch comprises a movable contact 100 having a high speed position shown in full lines for connecting the contact 101 with a contact 102. Contact 101 is connected through a fuse 103 with a battery 104 which is grounded. Contact 100 has an intermediate low speed position indicated by dash lines 100' for connecting contacts 101, 102 and 105, and a park or off position indicated by dot-dash lines 100'' for connecting contacts 101, 106 and 107. Contact 102 is connected with terminal 95, contact 105 with terminal 94, contact 106 with terminal 91, contact 107 with terminal 90. Contact 100 is operated by a knob 110 attached to a rod 111 connected with contact 100. At the left end (Fig. 11), a flexible tube 112, which is attached to a ferrule 113a attached to the case of the manually operated switch, is attached also to a ferrule 113 as shown in Fig. 2, supported by the cover 155 for a housing 128. Ferrule 113 has a rib 114 received by a recess 115 in cover 155. The rib 114 is retained in the recess 115 by a plate 116 attached by a screw 117 and having a notch 118 which receives the ferrule 113. The flexible rod or wire 111 passes through a small hole in the upper end of a plunger 120 and is attached to a pin 121 within the plunger. Movement of the switch contact 100 into high position causes the pin 121 to push against the plunger and move it upwardly into the position shown in Fig. 2. Movement of the contact 100 into the park position causes the plunger 120 to move down, motion being transmitted thereto from the pin 121 by a spring 122 whereby the plunger 120 is moved into a certain controlling position while the pin 121 may have a certain amount of over-travel. Movement of plunger 120 may be restricted by trigger 139 if the switch is moved to the park position when the trigger is directly under the pin. Pin 121 then moves compressing spring 122. Spring 122 moves plunger 120 as soon as trigger 139 moves out of the way. In this controlling position, rotation of shaft 69, Fig. 2, is arrested in a manner to be explained.

When contact 100 is in high position, the following circuit is established: battery 104, contact 101, contact 102, terminal 95, and two circuits in parallel, one being the armature 33 and the other being the resistance 97, terminal 94 and field winding 23. When contact 100 is in low position, the following circuit is established: battery 104, contact 101, and two circuits in parallel, one being terminal 95 and the armature 33 and the other being contact 105, terminal 94 and field winding 23. Resistance 97 is by-passed. When contact 100 is moved to park position, the following circuit is established: battery 104, contact 101, and two circuits in parallel, one being contact 106, terminal 91, normally closed contacts 83, 85, terminal 95 and the armature 33 and the other being contact 107, a terminal 90, normally closed contacts 82 and 84 and the field winding 23. Movement of contact 100 to park position is immediately followed by the arresting of motion of shaft 69, Fig. 2, which results in separation of the clutch parts 60, 61, and the separation of contacts 82 and 83 from contacts 84 and 85, respectively, whereupon operation of the motor 20 ceases.

Movement of the contact 100 to the park position results in locating the wiper blades in a parking position outside their normal range of movement. The mechanism which provides for oscillation of the blades through a normal range and for stopping the blades in a parking position outside the normal range will now be described, with reference to Figs. 1 through 10. Referring to Fig. 2, shaft 69, which is journaled in a bearing 127 in a housing 128 attached to frame 25, drives a plate 130 which rotates counterclockwise as shown in Fig. 7 and which carries a lug 131 to be engaged by the plunger 120 when switch 100 is moved into parking position. When the switch is in the other positions, low and high, rotation of the plate 130 is unobstructed. Plate 130 supports a cover plate 132 which is spaced above the plate 130 by washers 133 and by the extruded offsets 134 of cover 132. Cover 132 and washers 133 are attached to plate 130 by rivets 135. Cover 132 is provided with a notch 136 which receives a roller 137 journaled on a stud 138 attached to a trigger 139 having an L-shaped opening 140 receiving a pin or stud 141, the shanks of which are riveted to both the plate 130 and the cover 132. Normally the notch 140a of the opening 140 receives the pin 141, said relation being normally maintained by a spring 142 having a portion 142a bent around one of the washers 133 and having its free end 142b urging the trigger 139 counterclockwise about its pivotal connection with the cover 132 provided by the engagement of the roller 137 with the notch 136. When the trigger 139 is so located, the roller 137 will be located at a minimum radial distance from the axis of rotation of the plates 130 and 132 so that the wiper blades will be actuated through the normal range.

Roller 137 is received by a slot 150 in a plate 151 which is guided between the flanges 152 of a plate 153 which screws 154 attach to the housing 128. Plate 151 is retained upon plate 153 by the cover plate 155 which supports the ferrule 113. The plate 151 provides a rack 156 meshing with a gear segment 157 attached to a shaft 158 journaled in a bearing 159 provided by housing 128 and in a bearing 160 provided by cover 155. Shaft 158 operates a lever 161, the ends of which are connected in any suitable manner with crank arms for oscillating the wiper blades.

When the switch 100 is in the high or low positions, the travel of the plate 151 is that represented by the distance between the full-line position of slot 150 and the dot-dash line position thereof 150'. This amount of motion causes the wiper blades to oscillate within their normal range. When it is desired to park the blades, the switch 100 is moved to park position which causes the plunger 120 to move into the plane of rotation of the trigger 139 and of the lug 131. Therefore as these parts rotate counterclockwise from the position shown in Fig. 7 to that shown in Fig. 8, the trigger 139 is caused to move into the position shown in Fig. 8 due to the engagement of the plunger 120 with the cam surface 139a of the trigger 139. As the trigger so moves, its notch 140a is moved away from the pin 141 so that the latter can be received by the notch portion 140b. Motion of plate 130 is stopped when its lug 131 engages the plunger 120 as shown in Fig. 8. By the time motion of plate 130 has been stopped, the radius of the axis of the roller 137 with respect to the axis of the plate 130 has been increased to such extent that the plate 151 stops with its left end in the dot-dash line position 151', Fig. 1. This extra movement is sufficient to move the wiper blades into a parking position outside their normal range. Coincidentally with parking the blades, the electrical circuits between the motor and the battery are interrupted by separation of clutch parts 60 and 61.

Movement of the switch 100 to either the low or high position effects by-passing of the open switch contacts 82, 84 and 83, 85 so that the motor will resume operation and effects retraction of the plunger 120 from the plane of movement of the lug 131 and trigger 139. As plate 130 rotates, the trigger 139 is restored to its normal location with respect to the plate 130. While the plate 130 is moving from the position shown in Fig. 8 toward that shown in Fig. 9, the return movement of the trigger 139 is started by roller 137 engaging the lower end of the slot 150 (Fig. 9) which is not long enough to pass roller 137 in its extended position. In this way, the notched portion 140a of slot 140 is brought into position to receive the pin 141, which said notch receives again due to the action of spring 142 as it moves from the dot-dash line position 142' to the full-line position 142 in Fig. 10. Thus the normal radius of the roller 137 with respect to the axis of rotation of the plate 130 is restored and reciprocation of the wiper blades takes place within the normal range.

We claim:

1. Apparatus for operating a windshield wiper comprising a motor, an actuator for moving a wiper blade, means for transmitting motion from the motor to the actuator including an adjustable-throw crank having a normal position for effecting movement of the actuator in a normal range and having a second position for effecting movement of the actuator outside the normal range, a manually positioned member for stopping rotary movement of the crank, and means cooperating with said member for causing the crank to move to its second position before rotary movement of the crank ceases.

2. Apparatus for operating a windshield wiper comprising a motor, an actuator for moving a wiper blade, means for transmitting motion from the motor to the actuator including a torque-limiting clutch and an adjustable-throw crank having a normal position for effecting movement of the actuator in a normal range and having a second position for effecting movement of the actuator outside the normal range, a manually positioned member for stopping rotary movement of the crank whereupon the clutch disengages, means cooperating with said member for causing the crank to move to its second position before rotary movement of the crank ceases, and means responsive to the disengagement of the clutch for causing operation of the motor to cease.

3. Apparatus for operating a windshield wiper comprising a motor, an actuator for moving a wiper blade, means for transmitting motion from the motor to the actuator including a torque-limiting clutch and an adjustable-throw crank having a normal position for effecting movement of the actuator in a normal range and having a second position for effecting movement of the actuator outside the normal range, a manually positioned member for stopping rotary movement of the crank whereupon the clutch disengages, means cooperating with said member for causing the crank to move to its second position before rotary movement of the crank ceases, means responsive to the disengagement of the clutch for causing operation of the motor to cease, and means responsive to retraction of the stop member for causing operation of the motor to be resumed.

4. Apparatus for operating a windshield wiper comprising a rotary driving means, an actuator for moving a wiper blade, means connecting the driving means to the actuator including an adjustable-throw crank having a normal position for effecting movement of the actuator in a normal range and having a second position for effecting movement of the actuator outside the normal range, a manually positioned member, and means including a cam cooperating with said member to move the crank to its second position.

5. Apparatus for operating a windshield wiper comprising a rotary driving means, an actuator for moving a wiper blade, means connecting the driving means to the actuator including an adjustable-throw crank having a normal position for effecting movement of the actuator in a normal range and having a second position for effecting movement of the actuator outside the normal range, a manually positioned member, means including a cam adapted to engage said member to move the crank to its second position, and means adapted to engage said member to stop rotary movement of the crank after the crank reaches its second position.

6. Apparatus for operating a windshield wiper comprising a rotary driving means, an actuator for moving a wiper blade, means connecting the driving means to the actuator including an adjustable-throw crank having a normal position for reciprocating the actuator in a normal range and having a second position for moving the actuator beyond the normal range, and a manually operable member cooperating with the crank to cause the crank to automatically move to its second position in response to rotary movement of the crank.

PAUL L. SCHNEIDER.
DEROTHER H. DUDDERAR.

REFERENCES CITED

The following references are of record in the file of this patent:

UNITED STATES PATENTS

| Number | Name | Date |
|---|---|---|
| 126,052 | Harrison | Apr. 23, 1872 |
| 2,376,010 | Sacchini | May 15, 1945 |
| 2,393,193 | Sacchini | Jan. 15, 1946 |